United States Patent [19]

Pegels

[11] 4,029,599
[45] June 14, 1977

[54] PROCESS FOR PASSIVATING A PROPHORIC CATALYST AND TAKING A HYDROGENATION REACTOR OUT OF OPERATION

[75] Inventor: Abraham A. Pegels, The Hague, Netherlands

[73] Assignee: Shell Oil Company, Houston, Tex.

[22] Filed: Apr. 18, 1975

[21] Appl. No.: 569,422

[30] Foreign Application Priority Data

Apr. 25, 1974 Netherlands .................... 7405565

[52] U.S. Cl. ........................... 252/414; 208/216; 252/419; 423/574 R
[51] Int. Cl.² ................... B01J 23/92; B01J 23/94
[58] Field of Search ..................... 252/419, 414; 208/251 H, 216, 150; 423/574

[56] References Cited

UNITED STATES PATENTS

| 3,505,206 | 4/1970 | Decker | 252/414 |
|---|---|---|---|
| 3,505,207 | 4/1970 | Haney et al. | 252/414 |
| 3,563,915 | 2/1971 | Eisenhauer et al. | 252/477 Q |
| 3,756,961 | 9/1973 | Francis et al. | 252/419 |
| 3,764,558 | 10/1973 | Tse et al. | 252/414 |
| 3,838,066 | 9/1974 | Lovell | 252/419 |
| 3,848,071 | 11/1974 | Groenendaal | 423/574 |

Primary Examiner—Patrick P. Garvin
Assistant Examiner—P. E. Konopka
Attorney, Agent, or Firm—Ronald R. Reper

[57] ABSTRACT

A process for taking out of operation a reactor containing catalyst which has been used for hydrogenation of a fluid feed, which process comprises contacting the catalyst at low temperature with ever increasing amounts of an oxygen-containing gas until no substantial heat is generated within the reactor and the oxygen partial pressure of gas in the reactor is at least 0.2 kg/cm².

11 Claims, No Drawings

PROCESS FOR PASSIVATING A PROPHORIC CATALYST AND TAKING A HYDROGENATION REACTOR OUT OF OPERATION

BACKGROUND OF THE INVENTION

The invention relates to a process for taking out of operation a catalyst-containing reactor for the catalytic hydrogenation of a fluid i.e. a liquid or gaseous feed, in which hydrogenation the feed is passed over a catalyst in the presence of added hydrogen. In general, hydrogenations of this type will be carried out at a temperature above 300° C. In many cases the feed will contain sulphur compounds, from which $H_2S$ is formed during hydrogenation.

The above-mentioned catalytic hydrogenations are often applied in the refining of mineral oil, but are also applied outside that field.

An example of the use of fluid feed is the catalytic desulphurization of certain petroleum fractions, such as a distillate fraction or a residual fraction. In this process the feed together with hydrogen is passed through a reactor filled with desulphurization catalyst at a temperature at which the feed is not yet or only slightly converted by cracking or isomerization. Sulphur compounds present in the liquid feed are hydrogenated with the formation of hydrogen sulphide. A desulphurized feed on the one hand and a hydrogen sulphide and unused hydrogen-containing gas on the other are discharged from the reactor. The latter gas, for example, can be passed to a Claus plant described below.

An example of catalytic hydrogenation involving a gaseous feed is the catalytic reduction of a Claus off-gas originating from a Claus plant for the preparation of elemental sulphur by reaction of sulphur dioxide and hydrogen sulphide. Claus off-gas still contains a percentage of unreacted sulphur compounds which must usually be removed, which may be effected by total reduction of the sulphur compounds with hydrogen to hydrogen sulphide, after which the hydrogen sulphide formed is removed from the Claus off-gas (for example by absorption) and is recycled to the Claus plant. Claus plants are found not only in refineries but also in natural gas fields, for processing the hydrogen sulphide removed from the natural gas.

A phenomenon which almost invariably occurs during the catalytic hydrogenation of sulphur compounds is the deposition of carbon on the catalyst. This carbon often originates either from hydrocarbons of the feed (for example in the desulphurization of petroleum fractions) or from combustion gases admixed for heating (for example at the reduction of Claus off-gas). In the desulphurization of liquid products, for example, tarry products are also deposited on the catalyst.

Solid particles, such as scale, silica, metal salts and iron particles, are usually deposited at the beginning of the catalyst bed, the sulphides and carbon being present over the entire length in the catalyst bed.

In the regeneration of this catalyst the carbon and the tarry products are burnt off, while sufficient oxygen mixed with a large quantity of steam or nitrogen is invariably supplied to maintain the temperature in the reactor at an acceptable level. Temperatures applied in practice often lie between 300° C and 500° C, since the carbon is not burnt off below this temperature. In this regeneration the sulphides are oxidized simultaneously with the carbon and the tar and with a view to the desirability of limited heat generation this oxidation may only proceed very gradually. The regeneration, therefore, usually takes a very long time, with large reactors up to some days.

In some cases, for example in the desulphurization of residual petroleum fractions, the total quantity of catalyst in the reactor is very large, for example 500 tons. In these cases the quantity of catalyst on which no solid particles have been deposited becomes, in an absolute sense, very large compared with the quantity of catalyst on which such deposition has occurred. A drawback is then that of the total quantity of catalyst the metal sulphides present are oxidized in order to cause the carbon and the tarry products to be burnt off.

When the reactor must be opened for some reason or other, it will not be sufficient for the reactor to be cooled and purged with an inert gas, as would be expected. It has, in fact, been found that when the reactor is purged with low-temperature inert gas for a long period of time and subsequently opened, the catalyst begins to glow in the open air and releases sulphur dioxide in case sulphur compounds have been present in the feed. Under these conditions the catalyst content consequently has a pyrophoric character, and the performance of work on or in the reactor is impossible or dangerous.

Up to now this problem has been solved by fully regenerating the catalyst content before opening the reactor. This solution, however, is expensive and time-consuming and the invention aims at providing other routes.

For example, it has been found to occur in practice that the reactor must be opened, while the activity of the catalyst has not yet decreased to such an extent that the catalyst requires regenerating. Another object of the invention is to provide a process in which this regenerating is not necessary in such cases and the reactor can nevertheless be opened.

It has now been found that the pyrophoric character of the catalyst is entirely removed by performing a fully controlled oxidation, in which measures are taken to maintain the temperature continuously below 300° C.

Surprisingly, this "passivation" of the catalyst takes place without the active sulphides, such as cobalt, nickel, molybdenum and/or tungsten sulphide, being oxidized. The passivation, therefore, takes considerably less time than the regeneration customary hitherto, in which latter treatment these sulphides are in fact oxidized.

It has further been found that also the carbon and the tarry products are hardly if at all oxidized in the passivation. There are distinct indications that the catalyst derives its pyrophoric character from the presence of finely divided iron and/or iron sulphide, which seems to be oxidized at low temperature.

SUMMARY OF THE INVENTION

The invention, therefore, relates to a process for taking out of operation a reactor-containing catalyst for hydrogenation of a fluid feed, in which hydrogenation the feed is passed over the catalyst in the presence of added hydrogen, said process comprising:

a. reducing the temperature in the reactor to below 300° C (if it was above 300° C) and maintaining the temperature below 300° until the reactor is opened;

b. discontinuing the supply of feed and replacing the added hydrogen with an inert purge gas at a time which may be before, after or during said reduction in temperature;

c. purging the reactor with purge gas;

d. subsequent to step (c) introducing an oxygen-containing gas into the purge gas in a quantity such that the initial oxygen content of the purge gas is at most 1% by volume;

e. increasing gradually the oxygen content of the purge gas to the reactor until the oxygen partial pressure of the purge gas is brought to at least 0.2 kg/cm$^2$, and no further appreciable heat generation in the reactor is found to occur, and then f. opening the reactor.

DESCRIPTION OF PREFERRED EMBODIMENT

Because in general the temperature in the reactor during the catalytic hydrogenation is above 300° C, the temperature in the reactor has to be reduced in most cases to below 300° C by cooling.

If the supply of feed is discontinued before the reduction of the temperature in the reactor, it is possible to effect the reduction of that temperature by means of the hydrogen supplied or with the purge gas. Especially in those cases where a heavy feed, such as a residual petroleum fraction is used, it is advisable already to discontinue the supply of feed at high temperature, to prevent hardening of the feed in the reactor.

In the event of the feed being a liquid e.g. a high boiling liquid, it is possible and preferred to change over to another, lighter feed, such as naphtha or gas oil, immediately before putting the reactor out of operation and to reduce the temperature in the reactor with this lighter feed. In this manner any rests of residual products which may have deposited on the catalyst particles are removed. The catalyst is cooled more rapidly with a liquid than with a gas.

It is also possible to reduce the temperature in the reactor during or partly during the interruption of the supply of feed, this interruption being effected gradually and therefore lasting a longer period of time. This simultaneous cooling and interruption of the feed occurs, for example, when hydrogen is supplied to the reactor and subsequently the supply of feed is gradually discontinued or when a colder feed is supplied than before.

The supply of feed may also be interrupted after the cooling and the cooling may be at least partly effected with the feed. In this case, of course, only a small part of the feed is hydrogenated, so that under certain conditions it may be advisable during cooling to use a feed which need not be hydrogenated.

It is preferred to reduce the temperature in the reactor with the aid of a hydrocarbon oil in particular with naphtha or gas oil.

The final object is to have a reactor in which the temperature is below 300° C and which contains neither feed nor hydrogen. The latter is obtained by purging the reactor with an inert gas before, during or after cooling. The said inert gas may, for example, consist of carbon dioxide, and is preferably nitrogen.

After substantially all the hydrocarbon and hydrogen feed has been removed from the reactor by sufficient purging with inert gas, for example less than 1% by volume is present, a small quantity of air or oxygen is admitted into the purge gas. This initial quantity must in any case be so low that less than 1% by volume of oxygen is present in the gas and must also be sufficiently low to ensure that the temperature in the reactor does not exceed 300° C.

The passage through the reactor of the purge gas with the low percentage of oxygen is now continued. A quantity of oxygen is consumed which is attended by a rise in temperature which, as already stated, should always remain limited to a maximum increase to 300° C.

The oxygen content of the purge gas is preferably so controlled that the temperature of the purge gas discharged from the reactor remains below 150° C. This temperature of the purge gas used is a reliable indication of the temperature in the reactor and is easy to determine.

According to an embodiment of the invention the oxygen-containing purge gas is recycled after it has been passed through the reactor, the purge gas being cooled and the oxygen content being supplemented. It will be clear that this provides a saving compared with the situation in which fresh purge gas is invariably supplied.

When the rise in temperature in the reactor begins to decrease at the oxygen percentage in the purge gas below 1% by volume, the oxygen content of the purge gas is gradually raised in the range above this limit of 1% by volume. It is then continuously ensured that the temperature in the reactor does not rise above 300° C.

Also, during this period in which the oxygen content in the purge gas is higher than 1% by volume, the purge gas is preferably recycled and oxygen or air is added. The rise in temperature for each oxygen increase will generally be lower in this period, since the controlled oxidation is in an advanced stage. The consumption of oxygen will also be lower.

In an embodiment of the invention the oxygen content of the purge gas is increased at a predetermined rate, a further rise being invariably postponed, however, as long as the temperature in the reactor exceeds a predetermined value. In this manner the passivation can be performed in a relatively simple manner from the control point of view.

The oxygen content of the recycling purge gas is preferably made up to the desired value by the addition of less air according as the rise in temperature in the reactor is higher. The oxidation is thus fully controlled and the rise in temperature is limited to a relatively constant value, since in the case of an excessive temperature rise the cause thereof — namely too high an oxygen content — is removed and in the case of too low a temperature rise the insufficient oxygen content is raised. An excessive rise in temperature involved the disadvantage of components being oxidized in the reactor which in fact need not be oxidized and too low a rise in temperature means that the controlled oxidation proceeds more slowly than is strictly necessary.

According to the invention the oxygen partial pressure is by preference ultimately maintained at at least 0.2 kg/cm$^2$, and preferably at least 0.8 kg/cm$^2$, for some time before the reactor is opened. The reactor is, preferably, further purged for some time, while no further appreciable heat generation is found to occur. Depending on the circumstances, this may take place at an oxygen partial pressure of at least 0.2 kg/cm$^2$ or below. The latter two measures guarantee optimum safety.

It has been experienced that under certain conditions there is a risk for local burning off of coke, which may lead to an uncontrolled temperature increase in the zone wherein the coke is burned off, and which undesired temperature increase may spread to other areas of the catalyst. Conditions in which such a phenomenon may occur are, e.g., the presence of large amounts of pyrophoric compounds in the reactor, or cases in which during the catalytic hydrogenation and/or the cooling of the reactor not all sites of the catalyst have been wetted by the cooling medium (e.g., naphtha or gas oil) and local dry zones exist. The latter phenomenon may happen in particular in cases in which the catalyst is polluted to an appreciable extent, which results in a poor distribution of the cooling agent over the catalyst.

In order to avoid any danger of uncontrolled temperature increase in the reactor, it is preferred that the reactor is purged with a hydrocarbon oil together with the purge gas. The hydrogen oil is very suitably petroleum-based, and may, e.g., consist of naphtha, or preferably of gas oil. The rate of hydrocarbon oil supply to the reactor may vary between wide limits. Preferably, the said rate amounts to at least about 5% to be about 25% of the designed rate of the supply to the reactor of the feed to be catalytically hydrogenated. In particular, the said percentage amounts to at least 10. The rate of circulating gas oil is, preferably, increased to about the design rate during the purge gas circulation.

In order to obtain a complete wetting of the catalyst, it is of advantage to fill the catalyst-containing reactor completely or substantially completely with a hydrocarbon oil (in particular a gas oil) before oxygencontaining purge gas is supplied to the reactor. Very suitable, the reactor is filled up with the hydrocarbon oil from below, after the hydrogen has been substantially removed from the reactor. After the hydrocarbon oil has subsequently been removed from the reactor, circulation of purge gas is started. To this purge gas a circulating hydrocarbon oil can be used immediately or after some time.

It is desirable that the temperature in the reactor should be relatively low before it is opened. This temperature is preferably at most 60° C. This low temperature may already have been reached during purging. It is also possible to cool the reactor after purging. It is then ensured that maximum conversion of iron sulphides, etc., can take place for as long as possible at a relatively high temperature. In the latter case forced cooling is preferred, for example with air, since the reactor — if left to itself — will cool off only very slowly.

The invention can, for example, be applied to a reactor for the catalytic desulphurization of a liquid hydrocarbon feed. Examples of such desulphurization processes are the desulphurization of light distillate fractions of petroleum and the desulphurization of residual petroleum fractions.

The invention may, however, also be applied to other processes, for example the catalytic reduction to hydrogen sulphide of sulphur compounds in a gaseous feed.

In the latter case the feed may, for example consist of the off-gas of a Claus plant for the preparation of elemental sulphur from sulphur compounds-containing gases.

In the above-mentioned types of desulphurization processes the catalyst very suitably consists of cobalt sulphide and/or nickel sulphide combined with molybdenum sulphide and/or tungsten sulphide, on a carrier at least the greater part of which consists of silica and/or alumina. Such catalysts have been found to exhibit pyrophoric properties. It will be understood, however, that any other type of catalyst which exhibits pyrophoric properties can be treated according to the present invention.

The invention provides an improvement of the process for the continuous catalytic hydrogenation of one or more sulphur compounds in a liquid or gaseous feed with the formation of hydrogen sulphide, in which hydrogenation the feed is passed through a catalyst-filled reactor in the presence of added hydrogen at a temperature above 200° C. The improvement consists in that by the time a predetermined increase in pressure drop across the reactor has occurred as a result of contamination of the catalyst layer on the feed end of the reactor, the reactor is taken out of operation by the process of one or more of the above embodiments of the invention, the contaminated catalyst layer is subsequently replenished and the reactor again put into operation. An advantage of this method is that the total quantity of catalyst need not — as hitherto — be replenished or regenerated. Especially in the case of a reactor for the catalytic desulphurization of a residual petroleum fraction the above-mentioned process of the invention has great advantages, since in such a case very large quantities of catalyst are used. In practice a total quantity of catalyst of about 750 $m^3$ per reactor is currently used, in which the steam-air regeneration often involves difficulties owing to the fact that about 0.5–1.0 ton of steam per ton of catalyst per hour is required for regeneration, which often constitutes a very high peak load for the refinery. In this connection an advantage of the process of the invention is that the purge gas can be recycled.

Especially in the case of liquid feed the pressure drop across a reactor for catalytic hydrogenation often rises owing to the deposition of scale on the first catalyst layer. This deposit often contains a high percentage of metals, such as metallic iron or metal salts originating from the apparatus or feed. The deposition of scale, however, does not imply that the catalyst is deactivated. In the desulphurization of liquid feeds the catalyst in a reactor for the desulphurization or residual petroleum fractions is, for example, so blocked after about half a year that the upperlayer must be replenished, whereas this period is generally much longer for the catalyst for desulphurization of distillate petroleum fractions, for example about 3 months to about 2 years. Further, too high a pressure drop repeatedly occurs before the catalyst has been deactivated.

An advantage of the passivation according to the present invention compared with the regeneration of the catalyst as previously effected, is that the catalyst need not be resulphided. In the case of the catalyst containing molybdenum a further drawback of the regeneration is that it occurs at a much higher temperature under oxidative conditions, so that there is a risk of sublimation of molybdenum trioxide. In this connection it should be noted that during the regeneration the burning-off generally takes place at a temperature between 370° and 470° C. Further, the above-mentioned embodiment of the invention is also based on the fact that the catalyst activity has been found not to be increased appreciably by the burning-off of the carbon, provided it is present in the usual percentages, the latter again being present again rather rapidly after the reactor has again been put into operation, without affecting the activity in a high degree. For this reason the burning-off the carbon is therefore not strictly necessary for regeneration.

The above-mentioned improvement of the process for continuous catalytic hydrogenation is preferably carried out in such a way that while the reactor is taken out of operation the $CO_2$ content in the purge gas leaving the reactor is controlled during the period when oxygen is present in the purge gas supplied to the reactor and this quantity of oxygen is reduced, or brought to zero, as long as the quantity of $CO_2$ exceeds a predetermined value. As soon as the $CO_2$ content becomes too high, this fact in itself is already an indication of too much carbon being burnt off. It is preferably ensured that the $CO_2$ content remains below 0.04% by volume.

The invention will now be illustrated with reference to the following Examples.

EXAMPLE I

In a semi-commercial plant for the catalytic desulphurization of residual petroleum fractions, 1470 tons of residual petroleum fractions were desulphurized. The plant consisted of a catalyst-filled desulphurization reactor. The catalyst comprised 3.2% by weight of Co and 9.2% by weight of Mo on a carrier mainly consisting of alumina, which had previously been sulphided. The reactor contained the catalyst as a fixed bed, the residual fraction to be treated was supplied at the top of the reactor and discharged at the bottom, in parallel flow with hydrogen.

Immediately before the passivation according to the invention, 3.2% by weight of Co and 9.2% by weight of Mo were present on the catalyst. At the top of the reactor the catalyst contained 10.2% by weight of V; 4.4% by weight of Ni; 0.7% by weight of Na and 0.40% by weight of Fe. At the bottom of the reactor the catalyst contained 0.8% by weight of V; 0.3% by weight of Ni; 0.2% by weight of Na and 0.04% by weight of Fe.

The reactor was now passivated, in which the feed of the residual fraction was first changed into gas oil with the continuous supply of a hydrogen-rich gas mixture. The reactor was cooled over a period of 10 hours. During this cooling period the fall in temperature was continuously less than 40° C/hour. The temperature of the gas supplied to the reactor was 15° C and after the said cooling the temperature of the gas discharged from the reactor was also 15° C.

The gas oil feed was now discontinued and the reactor was purged with a hydrogen-rich gas over a period of about 6 hours. The hydrogen was subsequently replaced by nitrogen and the reactor was purged with nitrogen until the hydrogen concentration was below 1% by volume. The nitrogen pressure was raised to 6 kg/cm² and the nitrogen was recycled by means of a compressor.

Subsequently air was injected in increments into the recycling nitrogen purge gas. The duration of the injections, however, increased continuously.

The Table shows, the process pressure (superatmospheric pressure), the duration of the air injections and the $CO_2$ percentage in the purge gas leaving the reactor.

TABLE

| Time in minutes | Superatmospheric pressure in kg/cm² | Duration of air injection in minutes | $CO_2$ percentage in vol.% in Reactor Exit Gas |
|---|---|---|---|
| 30 | 3.4 | 1 | — |
| 45 | 3.4 | 3 | — |
| 55 | 3.8 | 2 | 0.018 |
| 90 | 4.9 | 5 | — |
| 120 | 5.4 | 5 | 0.015 |
| 150 | 6.0 | 5 | 0.020 |
| 180 | 5.9 | 10 | 0.025 |
| 225 | 5.8 | 12 | 0.020 |
| 285 | 5.5 | 15 | 0.020 |
| 330 | 4.7 | 40 | 0.020 |
| 450 | 0.8 | full air circulation | 0.030 |
| 510 | — | end of passivation | 0.040 |

The passivation process was also controlled by continuously determining the $CO_2$ content. It is found that a large oxygen consumption occurred between 2.5 and 4 hours after the beginning of the purging. It is noted that the $CO_2$ content increases by the injection of air into the purge gas owing to the $CO_2$ present in this air.

The temperature of the purge gas was continuously 15° C at the moment it left the reactor. The passivation process according to the present Example has, therefore, been carried out very cautiously.

After purging for 7.5 hours by means of oxygen-containing nitrogen with increasing oxygen content, the passivation process was completed with forced-air circulation through the reactor for 30 minutes, after which the reactor was opened. The catalyst then had no more pyrophoric properties.

Analysis of the catalyst subsequently revealed that, dependent on the place of origin in the reactor, about 7–15% by weight of carbon and about 7–8% by weight of sulphur were present.

EXAMPLE II

In the semi-commercial plant described in Example I 106,000 tons of residual petroleum fractions were desulphurized. The catalyst was polluted to an appreciable extent, and contained much pyrophoric material.

The reactor was cooled to 40° C, the hydrogen was replaced with nitrogen and the pressure of nitrogen increased to 6 kg/cm², oxygen was supplied to the purge gas and the oxygen content of the purge gas was gradually increased as described in Example I.

The temperature was measured at several sites in the reactor and the $CO_2$ content of the off-gas was measured periodically. After about 20 hours (at an oxygen concentration in the purge gas of about 18% by volume) the amount of $CO_2$ in the off-gas increased drastically (from 0.03 to 0.3% by volume) and in the end part of the reactor a rapid temperature increase was measured (from the original 40°-50° C to 100° C). Subsequently, the reactor was opened and the catalyst was discharged. The catalyst originating from the end part of the catalyst was hot and gas oil vapor and $SO_2$ were emerged therefrom. Although the catalyst was not pyrophoric, it will be clear that the risk exists that at further temperature increase uncontrolled burning-off of coke may occur. This risk is avoided when taking the reactor out of operation according to Example III.

EXAMPLE III

A catalyst which had been used for the catalytic desulphurization of about the same amount of residual petroleum fractions as described in Example II, was cooled and the amount of hydrogen in the reactor was reduced to 1% by volume with the aid of nitrogen as a purge gas as described in Example II. The reactor was evacuated, and gas oil was pumped into the reactor from below until the total catalyst content of the reactor was completely submerged. Subsequently, the gas oil was removed from the reactor, and nitrogen was supplied to a pressure of 6 kg/cm². The nitrogen was circulated and simultaneously an amount of gas oil (10% of the amount for which the installation was designed) was circulated. The 1% by volume of oxygen was added to the purge gas. After 1 hour the circulation of nitrogen + oxygen was stopped and circulation of air at 6 kg/cm² was commenced. The gas oil circulation was gradually increased to about the design rate. After 3 hours of air and gas oil circulation, during which time no trace of temperature increase or undesired oxidation of coke had been experienced, the reactor was opened. The catalyst proved to be not pyrophoric.

What is claimed is:

1. A process for taking passivating a pyrophoric catalyst and out of operation a reactor containing said catalyst which has been used for hydrogenation of a fluid feed, in which hydrogenation the feed is passed over a catalyst consisting essentially of cobalt sulphide and/or nickel sulphide combined with molybdenum sulphide and/or tungsten sulphide or a carrier at least the greater part of which consists of silica and/or alumina in the presence of added hydrogen, said process comprising:
   a. When the temperature in the reactor is above 300° C reducing the temperature below 300° C;
   b. maintaining the temperature in said reactor below 300° C for following steps (d)-(h) until the reactor is opened;
   c. discontinuing the supply of feed and replacing the added hydrogen with an inert purge gas at a time which may be before, after or during said reduction in temperature;
   d. purging the reactor with purge gas and a hydrocarbon gas oil wherein the amount of hydrocarbon gas oil is from about 5 to about 25% of the design feed rate of the reactor;
   e. subsequent to step (d) introducing an oxygen-containing gas into the purge gas in a quantity such that the initial oxygen content of the purge gas is at most 1% by volume;
   f. circulating simultaneously said gas oil and said oxygen containing purge gas through the reactor;
   g. increasing gradually the oxygen content of the purge gas to the reactor until the oxygen partial pressure of the purge gas is brought to at least 0.2 kg/cm², and continuing the circulation of said gas oil and said oxygen containing purge gas until no further appreciable heat generation in the reactor is found to occur, and then discontinuing said circulation and;
   h. opening the reactor.

2. A process as in claim 1, wherein the temperature in the reactor is reduced with the aid of a hydrocarbon oil.

3. A process as in claim 1, wherein the inert gas consists of nitrogen.

4. A process as in claim 1, wherein the oxygen content of the purge gas is controlled so that the temperature of the purge gas discharged from the reactor remains below 150° C.

5. A process as in claim 1, which comprises:
   a. cooling the purge gas which has passed through the reactor;
   b. adding an oxygen-containing gas to the purge gas, and
   c. recycling the product of step (b) to the reactor.

6. A process as in claim 1, wherein the oxygen partial pressure of the purge gas in ultimately at at least 0.8 kg/cm² before the reactor is opened.

7. A process as in claim 1, wherein oxygen is added to the purge gas to the reactor incrementally or continuously at a rate whereby the carbon dioxide content of purge gas from the reactor remains below about 0.04% by volume.

8. A process as in claim 1, wherein the reactor has been in operation for the catalytic desulphurization of a liquid hydrocarbon feed.

9. A process as in claim 1, wherein the reactor has been in operation for the catalytic reduction to hydrogen sulphide of sulphur compounds in a gaseous feed.

10. A process as in claim 9, wherein during normal operation the reactor feed consists of the off-gas of a Claus plant for the preparation of elemental sulphur from sulphur compounds-containing gases 11. A process as in claim 1 which comprises, in step (f) gradually increasing the gas oil circulation to about design rate of the reactor.

* * * * *